United States Patent [19]
Fernbach

[11] 4,315,707
[45] Feb. 16, 1982

[54] VEHICLE LOAD SUPPORTING ARRANGEMENT

[76] Inventor: James L. Fernbach, 3882 Struble Rd., Cincinnati, Ohio 45247

[21] Appl. No.: 126,655

[22] Filed: Mar. 3, 1980

[51] Int. Cl.³ .................. B60P 7/12; B61D 3/16; B61D 45/00
[52] U.S. Cl. .................... 410/47; 410/49; 410/107; 410/111
[58] Field of Search ............... 410/36, 38, 39, 40, 410/42, 46, 47, 48, 49, 102, 106, 107, 111, 116

[56] References Cited
U.S. PATENT DOCUMENTS

| | | | |
|---|---|---|---|
| 1,745,055 | 1/1930 | Romine | 410/38 |
| 2,622,918 | 12/1952 | Staffe | 410/48 |
| 3,197,236 | 7/1965 | Burton | 410/49 |
| 3,829,148 | 8/1974 | Stoneburner | 410/49 |

FOREIGN PATENT DOCUMENTS 436962 6/1948 Italy .................... 410/111

Primary Examiner—Joseph F. Peters, Jr.
Assistant Examiner—Howard Beltran

[57] ABSTRACT

A load carrying vehicle. A plurality of back-up assemblies is mounted on beam members which support the load. Each back-up assembly includes an upright support member mounted on one of the beams, an upright sliding member slidably mounted on the support member for up and down sliding movement and a cap plate at an upper end of the sliding member for movement between a lowered position and a raised position. Timbers supported by the beams can engage sliding members of the back-up assemblies. Cap plates of a selected pair of back-up assemblies rest on each timber and the timer can engage sliding members of the pair of back-up assemblies.

8 Claims, 7 Drawing Figures

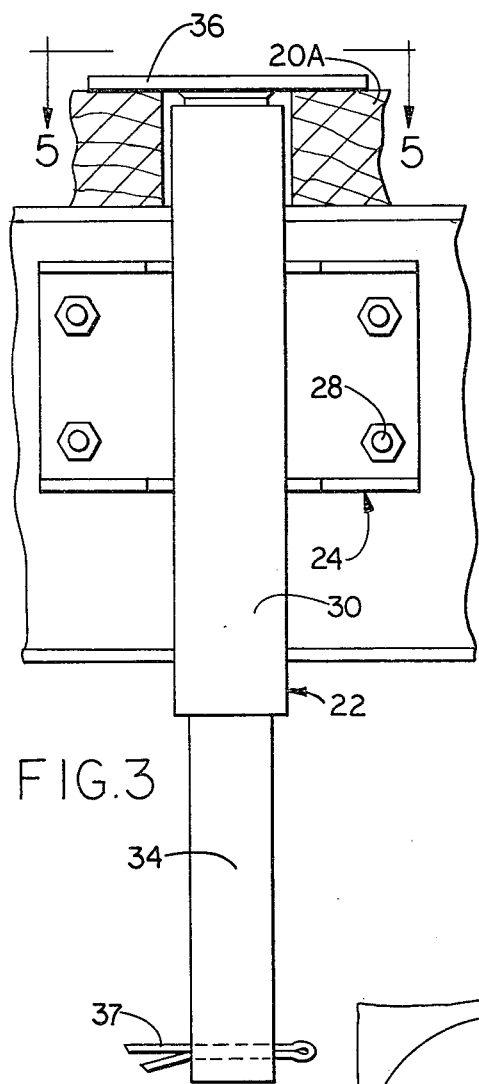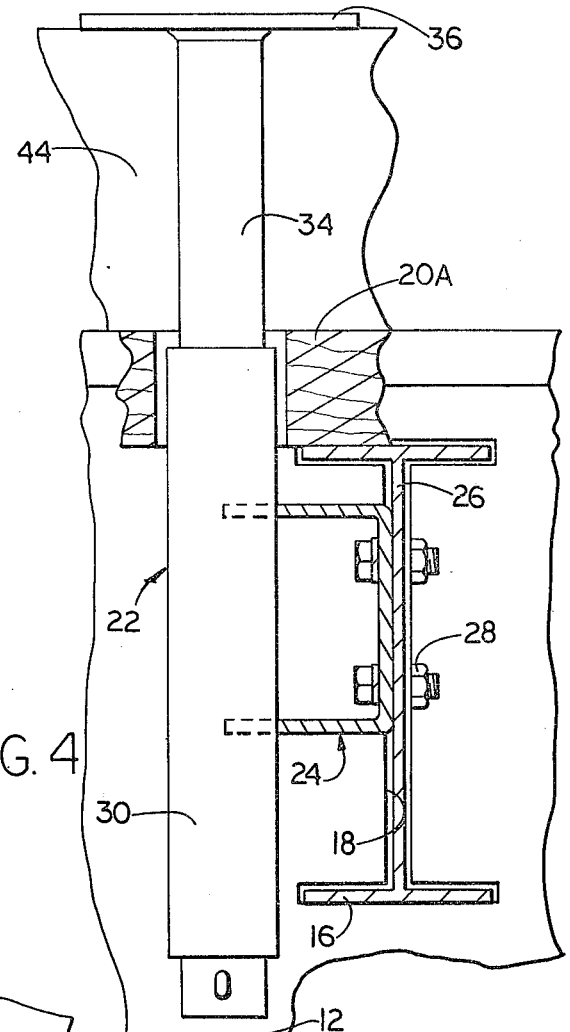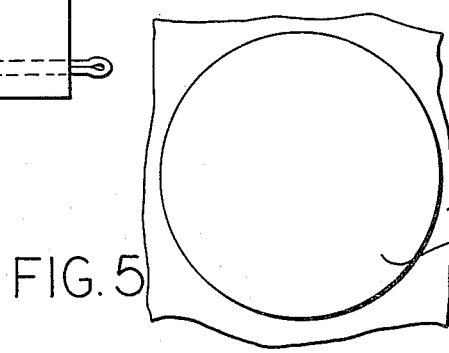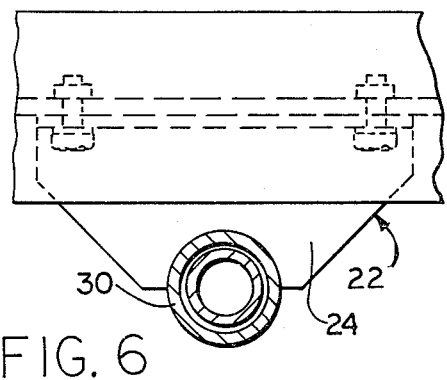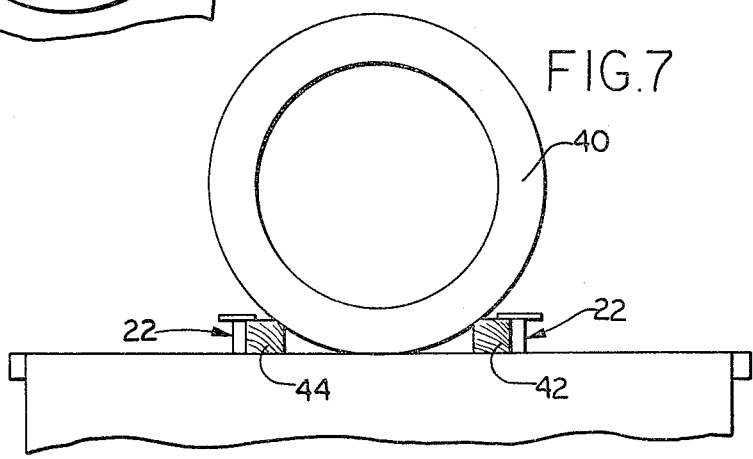

VEHICLE LOAD SUPPORTING ARRANGEMENT

This invention relates to a load supporting vehicle. More particularly, this invention relates to a floor construction for a trailer or the like for carrying heavy metal coils and the like.

An object of this invention is to provide a vehicle such as a trailer or the like which includes coil back-up members adapted to retain timbers for holding a coil of metal and in which the back-up members do not interfere with a floor of the vehicle when not in use.

A further object of this invention is to provide a load supporting assembly for a vehicle having back-up members which have upper portions which can be raised to an extended position in which the back-up members can retain the timbers in selected positions on the trailer floor.

Briefly, this invention provides a vehicle including beams which support a load carrying floor or the like. Upright guide members are mounted on the beams and slidably support upright sliding members which can be raised to extend above the load supporting floor. The sliding members can engage timbers supported by the beams to hold the timbers in position on the floor with sides of a metal coil engaging the timbers so that the coil is held in position. Cap plates mounted on upper ends of the sliding members can engage upper faces of the timbers. The cap plates can rest on the floor when the timbers are removed.

The above and other objects and features of the invention will be apparent to those skilled in the art to which this invention pertains from the following detailed description and the drawings, in which:

FIG. 3 is a fragmentary view in transverse section of the floor on an enlarged scale showing the back-up assembly in lowered position;

FIG. 4 is a view in section taken generally on the line 4—4 in FIG. 2;

FIG. 5 is a fragmentary plan view looking in the direction of the arrows 5—5 in FIG. 3;

FIG. 6 is a view in section taken on the line 6—6 in FIG. 2; and

FIG. 7 is a fragmentary view in rear elevation of the trailer body with the coil of metal mounted thereon.

In the following detailed description and the drawings, like reference characters indicate like parts.

Figure 1:
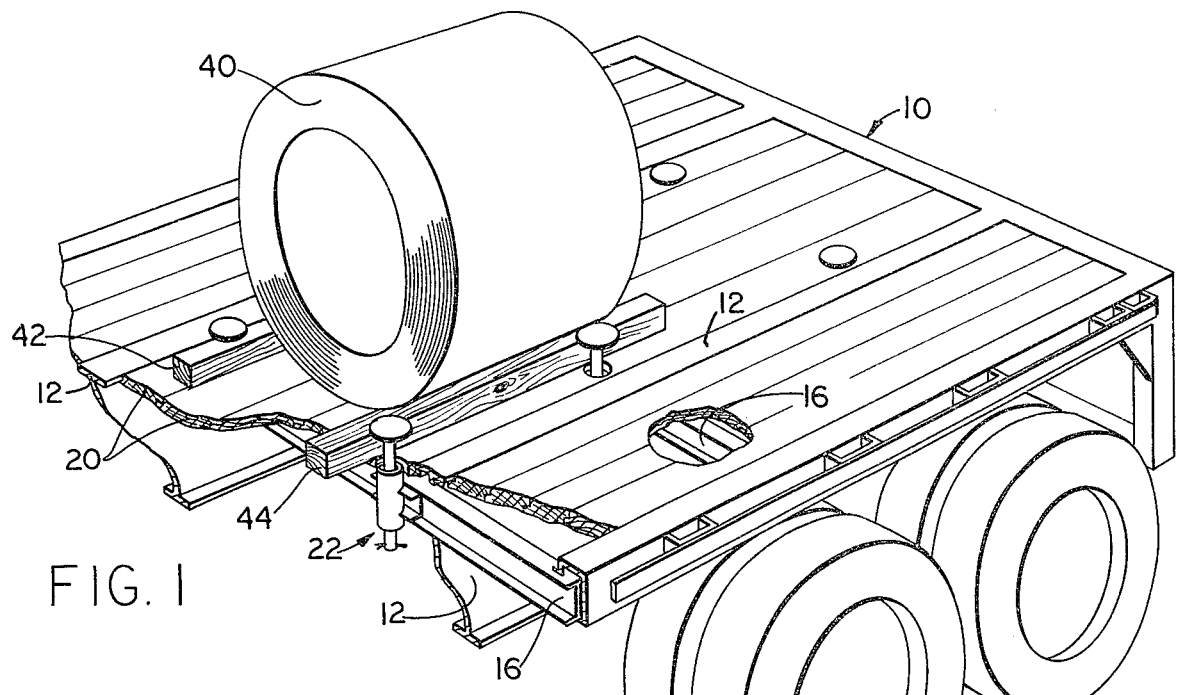
FIG. 1 is a fragmentary perspective view of a trailer body having a floor constructed in accordance with an embodiment of this invention, a coil of metal being shown mounted thereon.

In FIG. 1 is shown a fragmentary portion of a trailer 10 havng main lengthwise frames 12, which are supported by appropriate running gear 14, only a portion of which is shown. The lengthwise frames 12 support transverse frames or beams 16. Each transverse frame 16 extends through openings 18, one of which is shown in FIG. 4, in the lengthwise frames 12. Floor boards 20 are mounted on the transverse frames 16. The structure described to this point can be of conventional structure.

Mounted on the transverse frames 16 is a plurality of back-up assemblies 22. Details of construction of one of the back-up assemblies 22 are shown in FIGS. 2-6 inclusive. The back-up assembly 22 includes a channel-shaped bracket 24, which can be attached to a web 26 of the transverse frame 16 by appropriate fasteners 28. An upright tube 30 is mounted on flanges of the bracket 24. An upper end portion of the tube 30 extends into an upright opening 32 in a floor board 20A. An upright tubular sliding member 34 is slidably mounted in the upright tube 30. A circular cap plate 36 is welded to an upper end portion of the tubular member 34. Normally, the cap plate 36 rests on the floor board 20, as shown in FIG. 3, so that the cap plate is substantially even with the top of the floor and the back-up assembly 22 does not interfere with use of the floor. A cotter pin 37, which extends through openings 38 (only one of which is shown) in a lower end portion of the tubular sliding member 34, prevents withdrawal of the tubular sliding member 34 from the upright tube 30.

Figure 2:
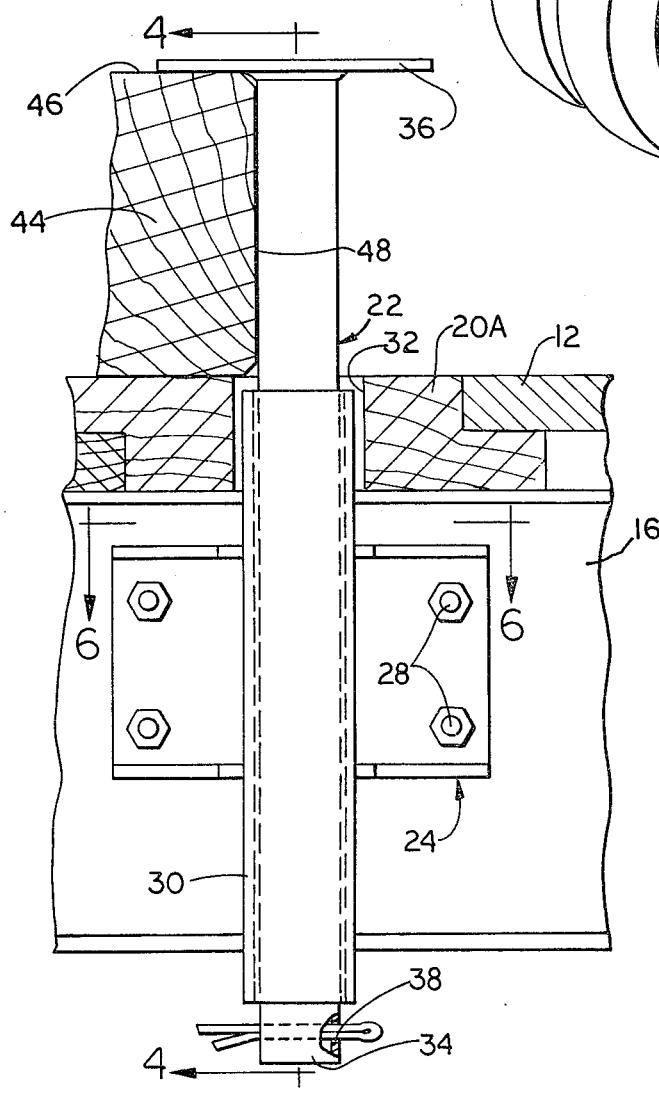
FIG. 2 is a fragmentary view in transverse section of the floor on an enlarged scale, a back-up assembly being shown in raised position.

When a coil of steel 40 (FIGS. 1 and 7) is to be mounted on the trailer 10, cap plates of selected ones of the back-up assemblies 22 are raised and timbers 42 and 44 are positioned adjacent thereto with the cap plate 36 of each back-up assembly resting on an associated timber as the cap portion 36 is shown in FIG. 2 resting on a top face 46 of the timber 44 and with a side face 48 of the timber 44 in position to engage the tubular member 34. When the coil 40 is positioned on the timbers 42 and 44, the coil engages inner and upper edge portions of the timbers as shown in FIG. 7 to prevent sidewise rolling of the coil 40.

The coil back-up assembly illustrated in the drawings and described above is subject to structural modification without departing from the spirit and scope of the appended claims.

Having described my invention, what I claim as new and desire to secure by Letters Patent is:

1. The combination of a vehicle including a frame having a plurality of beams, a supporting surface on the beams, and spaced timbers mounted on the supporting surface with a plurality of back-up assemblies, each of the back-up assemblies including an upright support member mounted on one of the beams, an upright sliding member slidably mounted on the support member for up and down sliding movement, and an integral cap plate at an upper end of the sliding member for movement between a lowered and a raised position, the sliding member engaging a side of one of the timbers mounted on the supporting surface to hold the timber in a load supporting position with the cap plate resting on the timber, a load being adapted to engage the other side of the timber to hold the timber against the sliding member.

2. In combination, a vehicle including a frame having a plurality of beams, a pair of timbers, a supporting surface on the beams for supporting the pair of timbers, a plurality of back-up assemblies, each of the back-up assemblies including an upright support member mounted on one of the beams, an upright sliding member slidably mounted on the support member for up and down sliding movement, and an integral cap plate at an upper end of the sliding member for movement between a lowered position and a raised position, a side of each of the timbers being engageable with sliding members of a selected pair of the back-up assemblies with the sliding members of the selected pair in raised position and with cap plates of the selected pair resting on the timber, and a load engaging the other side of each of the timbers to hold the timbers against sliding members of the assemblies.

3. A combination as in claim 2 in which the load is a coil of metal.

4. The combination of a vehicle including a floor and a frame having a plurality of beams underlying and supporting the floor with spaced timbers resting on the floor and a plurality of back-up assemblies, each of the back-up assemblies including an upright support member mounted on one of the beams, an upright sliding member slidably mounted on the support member for up and down sliding movement, and an integral cap plate at an upper end of the sliding member for movement between a lowered position adjacent the floor and a raised position spaced above the floor, the sliding member engaging a side of one of the timbers resting on the floor to hold the timber in a load supporting position with the cap plate resting on the timber, a load being adapted to engage the other side of the timber to hold the timber against the sliding member.

5. In combination, a vehicle including a floor and a frame having a plurality of beams underlying and supporting the floor, a plurality of back-up assemblies, each of the back-up assemblies including an upright support member mounted on one of the beams, an upright sliding member slideably mounted on the support member for up and down sliding movement, and an integral cap plate at an upper end of the sliding member for movement between a lowered position adjacent the floor and a raised position spaced above the floor, a pair of timbers resting on the floor, a side of each of the timbers being engageable with sliding members of a selected pair of the back-up assemblies with the sliding members of the selected pair in raised position and with cap plates of the selected pair resting on the timber, and a load engaging the timbers to hold the timbers against sliding members of the assemblies.

6. A combination as in claim 5 in which the load is a coil of metal.

7. The combination of a vehicle including a frame having a plurality of beams, a supporting surface on the beams, and timbers supported on the supporting surface with a plurality of back-up assemblies, each of the back-up assemblies including an upright support member mounted on one of the beams, an upright sliding member slidably mounted on the support member, and an integral cap plate at an upper end of the sliding member for up and down sliding movement between a lowered position and a raised position, the sliding member engaging a side of one of the timbers on the supporting surface with the cap plate resting on the timber to hold the timber in a load supporting position when the sliding member is in a raised position, the timbers being adapted to support a load with the load engaging the other side of each of the timbers to hold the timbers against the sliding members.

8. In combination, a vehicle including a frame having a plurality of beams, a pair of timbers, a supporting surface on the beams for supporting the pair of timbers, a plurality of back-up assemblies, each of the back-up assemblies including an upright support member mounted on one of the beams, an upright sliding member slidably mounted on the support member, and an integral cap plate at an upper end of the sliding member for up and down sliding movement between a lowered position and a raised position, a side of each of the timbers being engageable with sliding members of a selected pair of the back-up assemblies when the sliding members are in raised position with cap plates thereof resting on the timbers and a load engaging another side of the timbers to hold the timbers against sliding members of the assemblies.

* * * * *